US 6,529,473 B1

(12) United States Patent
Bavant et al.

(10) Patent No.: US 6,529,473 B1
(45) Date of Patent: Mar. 4, 2003

(54) DEVICE FOR ATM CELL SWITCHING, WITH FAILURE TOLERANCE

(75) Inventors: Marc Bavant, Paris (FR); Michel Delattre, Boulogne (FR); Dominique Bolot, Gif sur Yvette (FR); Thierry Grenot, Clamart (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/284,248

(22) PCT Filed: Oct. 10, 1997

(86) PCT No.: PCT/FR97/01812

§ 371 (c)(1),
(2), (4) Date: Apr. 15, 1999

(87) PCT Pub. No.: WO98/18240

PCT Pub. Date: Apr. 30, 1998

(30) Foreign Application Priority Data

Oct. 18, 1996 (FR) .............................. 96 12716

(51) Int. Cl.[7] .................................. H04J 3/14
(52) U.S. Cl. .................. 370/217; 370/221; 370/230; 370/235
(58) Field of Search ................. 370/217–218, 370/219, 220–221, 225–228, 230, 235–238, 241–242, 244, 250, 254; 714/2–3, 8, 10, 11

(56) References Cited

U.S. PATENT DOCUMENTS

| 5,153,578 A | * 10/1992 | Izawa et al. ............... 340/2.23 |
| 5,220,563 A | 6/1993 | Grenot et al. |
| 5,274,680 A | 12/1993 | Sorton et al. |
| 5,283,782 A | * 2/1994 | Takase et al. ............... 370/219 |
| 5,381,410 A | 1/1995 | Grenot |
| 5,394,393 A | 2/1995 | Brisson et al. |
| 5,398,236 A | * 3/1995 | Hemmady et al. .......... 370/218 |
| 5,471,460 A | * 11/1995 | Tanabe ....................... 370/218 |
| 5,732,081 A | 3/1998 | Grenot et al. |
| 5,757,770 A | 5/1998 | Lagoutte et al. |

OTHER PUBLICATIONS

U.S. patent application Ser. No. 09/284,248, filed Apr. 15, 1999, pending.
U.S. patent application Ser. No. 09/530,948, filed May 15, 2000, pending.
U.S. patent application Ser. No. 09/895,324, filed Jul. 02, 2001, pending.

* cited by examiner

Primary Examiner—Melvin Marcelo
Assistant Examiner—Inder Pal Mehra
(74) Attorney, Agent, or Firm—Oblon, Spivak, McClelland, Maier & Neustadt, P.C.

(57) ABSTRACT

A device for ATM cell switching having failure tolerance. The device is divided into two types of equipment modules. The first type includes connecting modules while the second type includes two branching and managing modules, one operating in an active mode while the other operates in a passive mode. An accessing device is implanted in each connector. Devices to execute the ATM layer function are almost identically implanted in each connector and in each of the two branching and managing modules. A supervision bus connects both types of modules to ensure quick and automatic reconfiguration of the device in case of failure in one of its components. The supervising bus is of simple configuration and only serves to carry, under the control of the managing module, signals indicative of the master and slave managing means as well as a signal indicative of the active branching module.

21 Claims, 1 Drawing Sheet

DEVICE FOR ATM CELL SWITCHING, WITH FAILURE TOLERANCE

BACKGROUND OF THE INVENTION

1. Field of the Invention

The present invention relates to an economical distributed-architecture device for switching ATM cells in a local area network, with fault tolerance of the cross-connection and management functions.

2. Discussion of the Background

Investigations of telecommunications systems are increasingly calling upon a mode of transfer called ATM, the abbreviation standing for Asynchronous Transfer Mode. This technique makes it possible to convey digital information, the nature and bit rate of which are as varied as they are irregular (for example voice, video, files). The information is transported across a network which can be of various topologies (for example mesh, ring, star, etc.). Each node of the network, called an ATM switch, is linked to the adjacent node by a transmission highway which accepts all types of technologies (cable, radio beam, optical fibre, etc.).

The principle of the ATM technique is to segment the data emanating from the various services into blocks of fixed length, and to append a header to this block so as to form an ATM cell. The ATM cells originating from the various sources are multiplexed and transmitted asynchronously on the transmission highway.

The routing of the cells relies on a logic channel-based mode, the value of which is written into the header of the ATM cell. Thus, each physical highway is logically equivalent to several paths. The ATM switches establish link-ups between these logical channels so as to form virtual routes between the ends of the network.

An essential function of an ATM switch is to be able to translate the incoming logical channel in such a way as to switch the ATM cell onto the appropriate outgoing path. This function relies on a prior operation of tagging the virtual route in each ATM switch.

A great majority of ATM switches of local area networks such as described in the document entitled "Redundant Asynchronous transfer Mode Switching Module", IBM Technical Disclosure Bulletin, Vol 39, No. 4 Apr. 1996, pages 227 to 229, are switches having centralized, or weakly distributed, architecture, and in which the functions specific to the ATM technique are grouped together into an entity called the ATM layer. This entity performs in particular the translation of the (VPI, VCI) pair contained in each cell header, VPI and VCI being the abbreviations for "Virtual Path Identifier" and "Virtual Channel Identifier", respectively, the processing of OAM management cells, the abbreviation for "Operations Administration and Maintenance". The switch's management function consists in particular of procedures for local supervision, routing and signalling. The functions of an ATM switch consist generally, apart from the ATM layer function and the management function, of an access function and a cross-connection function. In the case of a centralized architecture all these functions are executed by a single hardware unit which groups together calculational capabilities consisting of micro-processors, storage capabilities in the form of memories and capabilities for steering the cells in the form of cross-connectors.

This concentration is detrimental to the modularity of the switch and to its capacity to remain operational when one of the elements of which it consists develops a fault.

A conventional solution to this problem consists in distributing the functions over distinct hardware units, which are possibly duplicated to allow the backup of a defective unit of the same nature, and are installed in the switch in sufficient number to satisfy the foreseeable processing load depending on the configuration of the network at this spot. In practice these units consist of cards having electronic components and which are brought together in a rack, and converse with one another via one or more data buses laid out in a backplane rack.

Nevertheless, this solution is expensive since the development of every new card includes an irreducible design expense which will raise the cost price of the switch. Moreover, the exchanging of information between these cards requires complex and expensive connecting arrangements which must meet the operational needs of the system, by means of high bit rate buses for example, sometimes to the detriment of the possibility of using, in one and the same rack, off-the-shelf cards whose standard interface as more conventional, of the VME or PCI bus type.

The distributed architecture is consequently reserved as a priority for big switches involved in public telecommunications networks. Within the framework of these networks, fault tolerance, when it exists, is achieved by duplicating the vital units of the switch and by their simultaneous parallel operation. This type of active redundancy is difficult to manage. This is because an incoming cell entering the switch at one of its accesses is immediately duplicated and processed in parallel by the two redundant units, after which the two resulting cells are compared so that only one of them is returned to the network. This assumes perfect synchronism between the redundant units or, at the very least, means for managing any possible asynchronism. As regards the switch's management function, the problem is identical: any message originating from the network has to be duplicated, processed in parallel and lastly merged with its dual. All of this is expensive and complex.

SUMMARY OF THE INVENTION

The purpose of the Invention is to alleviate the aforesaid drawbacks.

To this end, the subject of the invention is a distributed-architecture device for switching ATM cells of the type comprising access means (1), means for executing the ATM layer function, means for executing the cross-connection of the ATM cells and management means, the whole of the means of the device being distributed between two types of hardware modules, a first type composed of junctor modules and a second type composed of two cross-connection and management modules, one operating in an "active" mode and the other in a "passive" mode, in that the access means are installed in each junctor, the means of executing the ATM layer function are installed almost identically in each junctor and in each of the two cross-connection and management modules and in that it comprises a supervising bus which links the first and second types of module, so as to ensure rapid and automatic reconfiguration of the device in the event of a fault in one of its constituents, the supervising bus being of simple configuration and serving merely to convey, under the control of the management means, signals indicative of the "master" and "slave" management means as well as a signal indicative of the "active" cross-connection module characterized in that each cross-connection and management module comprises a cross-connector subassembly coupled to the junctor modules and to subassemblies for managing the modules of the second type so as to allow a changeover of the operation of the device from the cross-connection and management module currently in use to the other cross-connection module when a fault occurs in the cross-connection and management module currently in use.

An advantage of the invention is economical implementation of the device, requiring only a small number of soecific electronic cards which can be produced with the aid of components or of processor cards available off-the-shelf. Another advantage is that it allows simple reconfiguration of the device in the event of a fault owing to the absence of parallel operation of the duplicated vital units and by virtue of the possibility which it offers of performing automatic changeover to the backup unit in the event of a fault with a vital unit.

Given the need to produce an economical architecture, and given the present state of the art, the changeover between a hardware module and its backup module cannot be effected without disturbing the services rendered by the switch. The changeover from one cross-connection module to another may be accompanied by the loss of a few cells. The changeover from one management module to another may be accompanied by the breaking of the established connections. Nevertheless, the architecture proposed and the processes for implementing these changeovers make it possible to minimize their operational impact. Thereby, it is likely that the disturbances introduced by the changeover itself are no more serious than those introduced by the poor operation of the faulty unit before the fault is detected.

Since the most delicate element in this architecture is the management module which is exposed to the vagaries of software errors, the architecture proposed makes it possible to detect the fault, to activate the backup management module, to keep the same cross-connector initially so as to avoid any disturbance to the established connections for as long as the management module is not completely ready to cope with the requests for reconnections, then to change over to the cross-connector local to the active management module so as to allow a maintenance operator subsequently to extract the faulty card and replace it without disturbing the proper operation of the switch.

However, the management module is not the only one which may develop a fault. If the cross-connection module is no longer operating correctly the architecture proposed also makes it possible to detect the fault, to change over to the backup cross-connector, to keep the same management module while awaiting the favourable moment to execute the changeover (slack period, etc.), then to change over to the management module situated in the same card as the active cross-connector module.

BRIEF DESCRIPTION OF THE DRAWINGS

Other characteristics and advantages of the invention will become apparent with the aid of the description which follows in conjunction with the appended drawings which represent.

DETAILED DESCRIPTION OF THE PREFERRED EMBODIMENTS

Figure 1:
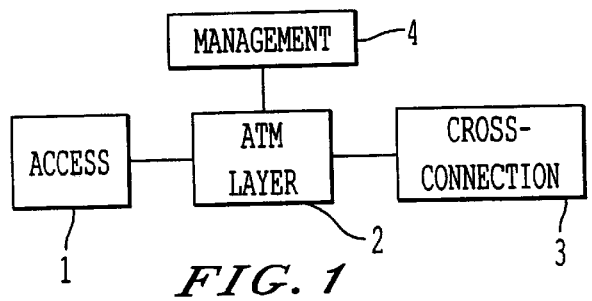
FIG. 1 the main functions which characterize an ATM switch.

Conventionally, an ATM switch comprises, in the manner represented in FIG. 1, four subassemblies. A first subassembly 1 carries out the function of access to each port of the switch. A second subassembly 2 executes the ATM layer function. The third subassembly 3 carries out the cross-connection function and the fourth subassembly 4 carries out the management function.

In the subassembly 1 each port of the ATM switch caters for the conversion of ATM cells into the format appropriate to the transmission medium connected to the said port and vice versa. This function makes it possible to present the incoming cells to the ATM layer and vice versa in a single format which is independent of the bit rate and of the optical or electrical technology for example, of the transmission medium from which they originate. The ports of a switch make it possible to connect together several switches and they also make it possible to connect a user of ATM services to a switch.

The processing to be implemented in the access function 1 is described in copious prescriptive literature, from the ANSI which is the abbreviation for American National Standard Institute, from the ITU (the International Telecommunications Union) and from the ATM Forum. The PDH, SDH, SONET and Hex 25 classes of interfaces are described in the following standards:

.PDH (Plesiochronous Digital Hierarchy): UIT-T G.804, G.703 etc.

.SDH (Synchronous Digital Hierarchy): UIT-T G.708 etc.

.SONET (Synchronous Optical Network): ANSI TI.105 etc.

.Hex25: af-phy-0040.000.

The subassembly 2 groups together several subfunctions such as in particular the management of the cell headers, the translation of the logical channels VPI/VCI (Virtual Path/Channel Identifier), the processing of the OAM (Operations Administration and Maintenance) management cells, a considerable part of the traffic, management such as: UPC (Usage Parameter Control), SCD (Selective Cell Discard), EPD (Early PDU Discard), RM (Resource Management) cells etc.

The processing to be implemented in the ATM layer function is described in particular in the following standards of the ITU and of the ATM Forum:

.B-ISDN ATM Layer Specification (UIT-T I.361)

.B-ISDN Operation and Maintenance Principles and Functions (UIT-T I.610)

.Traffic Management Specification version 4.0 (af-tm-0056.000)

The subassembly 3 switches the cells from an input direction to an output direction, as a function of indications computed by the ATM layer during translation of the logical channels.

This function, which is at the heart of any ATM switch, may for example be implemented in the manner described in French Patent Application No. 2 635 243 filed in the name of the Applicant.

The subassembly 4 comprises subfunctions such as: local supervision of the switch (alarms, uncovering of the configuration of the switch and of the local topology, management of versions etc.), dialogue with the centralized supervision of the network, the necessary dialogues for establishing switched virtual circuits etc.

A detailed description of some of these subfunctions may be found in the prescriptive literature from the ATM Forum:

.ATM User-Network Interface (UNI) Signaling Specification Version 4.0 (af-sig-0061.000)
.Private Network-Network Interface Specification Version I.0 (af-pnni-0055.000)
.Integrated Layer Management Interface (af-ilmi-0065.000)

These various functions interface with one another as indicated in FIG. 1. It should be noted that the management function behaves exactly like a user except that its connection to the ATM layer does not involve an external port of the switch and, hence, does not require an access function. On the other hand, the management function does not handle only ATM cells but also messages. The latter are segmented and reassembled by way of an AAL layer (the abbreviation standing for ATM Adaptation Layer) which forms the subject of an addtional function: the adaptation function.

Figure 2:
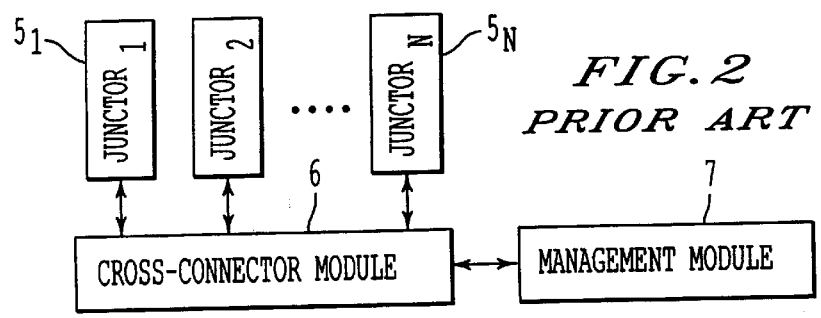
FIG. 2 a diagram of the hardware architecture of an ATM switch with distributed architecture according to the prior art.

Traditionally, an ATM switch with distributed architecture comprises three types of modules as represented in FIG. 2, junctor modules $5_1$ to $5_N$, a cross-connector module 6 and a management module 7. The functions of the switch are shared out among these various modules. The junctor modules handle at least the access function, the cross-connector module deals with the cross-connection function and the management module deals with the management function.

Figure 3:
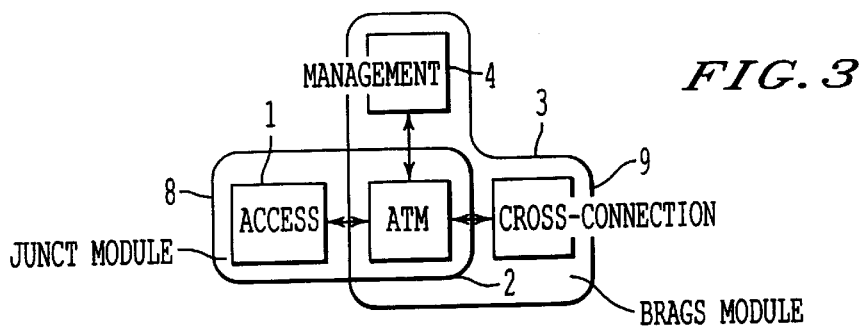
FIG. 3 a basic diagram of the sharing-out of the functions of an ATM switch according to the invention.

The architecture diagram according to the invention which is represented in FIG. 3, and which is called a FLEX architecture in what follows, relies on only two distinct types of hardware modules which are referred to hereafter as junction modules "JUNCT" and cross-connection and management modules "BRAGS" which distribute the functions of the switch.

The JUNCT modules 8 group together in the form of an electronic card all of the access and ATM layer functions relating to the ATM cells which pass through one of the access ports controlled by this card. It also comprises a function for controlling the supervising bus (changeover) which by convention is here included within the ATM layer function. In order to allow the card to be made as general-purpose as possible, the access function may be installed in a separate circuit which can be easily dismantled and replaced. This circuit called the access module is specific to each type of possible access to the ports of a JUNCT module 8. Thus, one and the same JUNCT module may be fitted, by choice, with a 155 Mbit/s port or with 6 25 Mbit/s ports simply by replacing the access module. Since the implementation of the ATM layer function requires a large storage and calculational capacity, fast microprocessors of the RISC, DSP or Transputer type may be used for this purpose, the acronyms RISC and DSP being the abbreviations standing for "Reduced Instruction Set" and "Digital Signal Processor".

The BRAGS modules 9 group together in the form of an electronic card all of the cross-connection and ATM layer functions relating to the cells originating from or destined for the management function the function of ATM adaptation between messages and cells, and also the management function. To allow maximum upgradability of this card, the cross-connection function and the management function may each be installed in separate circuits which can be easily dismantled and replaced. The cross-connection function is installed in the cross-connector module for which several technologies may be envisaged, based on a switching matrix or ring structure for example. The management function is installed in the management module which may take the form of a commercially available processor card fitted with a standard VME or PCI interface.

Figure 4:
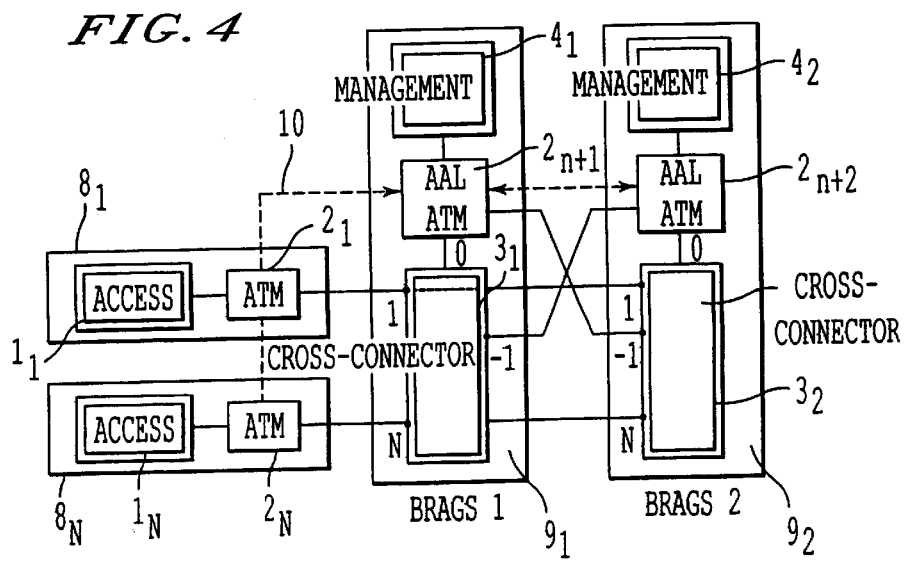
FIG. 4 the architecture of an ATM switch according to the invention.

Two other functions are present in the BRAGS module: the AAL adaptation function and the supervising bus control function allowing as will be apparent in FIG. 4 the selection of the active cross-connector and the determination of the master management module. These two additional functions are included here by convention in the ATM layer function.

The implementation of the cross-connection function requires special-purpose circuits such as, for example, ATM cross-connection integrated circuits. As far as the ATM layer and adaptation functions are concerned, they require similar storage and calculational capacities to those found in the ATM layer of the JUNCT modules 8.

The example of a FLEX architecture according to the invention which is represented in FIG. 4 in which the elements which are the counterparts of those of FIG. 3 are represented with the same references, comprises "JUNCT" modules $8_1$ to $8_N$, the number N of which is determined as a function of the needs in terms of access ports as well as two "BRAGS" modules $9_1$ and $9_2$ which cater in turn for the management and cross-connection functions. The rectangles with dual outlines represent hardware submodules which may be rendered dismantleable from the encompassing hardware modules, thereby making it possible to adapt the submodule to the configuration required, number of access ports, management calculating power, cross-connector technology, without modifying the card medium. These submodules bring together the access function of subassembly 1 in each JUNCT module ($8_1$ to $8_N$), the cross-connection function of subassembly 3 and the management function of subassembly 4 in each of the BRAGS modules $9_1$ and $9_2$. The N "JUNCT" modules $8_1$ to $8_N$ are linked respectively to N inputs of the cross-connector subassemblies $3_1$ and $3_2$.

The links depicted with a solid line are ATM links on which the format of the cells may be slightly different from that in force in the network. In order to harness the components which are available off-the-shelf, it is advantageous to use links to the UTOPIA standard, a description of which may be found in the ATM FORUM document No. af-phy 0039.000 or any other widespread standard adapted for the bit rates in question. Access points numbered "0" in the cross-connector subassemblies $3_1$ and $3_2$ are reserved for the links with the local ATM layers $2_{N+1}$ and $2_{N+2}$ of the BRAGS modules $9_1$ and $9_2$. Access points No. "-1" are reserved in each cross-connector subassembly $3_1$ and $3_2$ for the link with the ATM layer of the other BRAGS module, the effect of this being to allow the equipment to operate in the event of two complementary faults (fault with the cross-connector of a BRAGS module and fault with the management module of the other). The points numbered from 1 to N of the cross-connector subassemblies $3_1$ and $3_2$ are reserved for a link with the ATM layer $2_1$, $2_N$ of the JUNCT module of the same number, the subassemblies $2_1$ being by convention responsible for using the active cross-connector $3_1$ or $3_2$ as a function of the commands received over the supervising bus 10.

A supervising bus 10, dashed in FIG. 4, caters only for implementing the redundancy and the changeover of the two BRAGS modules $9_1$ and $9_2$, this requiring only a very restricted number of wires, conveying very simple signals. The remainder of the supervision and management dialogues takes place in the form of ATM cells of the private OAM type which borrow the ATM links of the switch, thereby making it possible to transfer considerable quantities of information in a short time. This allows for example the upgrading of the software (loading of a new version of the software) residing in each JUNCT module after working on a module without incurring a significant delay in making it operationally available, the extraction or the insertion of cards giving rise to completely automatic processing of the type known by the phrase "Plug And Play". Moreover, the simplicity of the backplane rack (UTOPIA link, supply, supervising bus) makes it possible to envisage an exchange while the cards are operating without powering-down the machine (hot swap).

The embodiment described in FIG. 4 makes it possible to obtain ATM switch operation according to which at any moment just one of the two cross-connector subassemblies $3_1$ and $3_2$ is used in the course of its working operation, one cross-connector subassembly being said to be in the "active" mode of operation and the other being said to be in the "inactive" mode of operation. This does not in any way rule out the fact that the second cross-connector subassembly can perform nonoperational tasks such as for example tests for proper running. Likewise, at any moment just one of the two management subassemblies $4_1$, $4_2$ serves for the operational running of the switch. This subassembly is then termed the "master" and the second is termed the "slave". The "slave" subassembly can however perform nonoperational tasks such as, for example, tests of proper running, eavesdropping services (software probes) or more or less accurate tracking of the operational data of the "master" subassembly so as to allow it, at the appropriate moment, to become the "master" in its turn so as, for example, to cover for a defect in the other subassembly with a minimum of disturbance to the service. The two management subassemblies $4_1$ and $4_2$ converse with one another mainly by way of the cross-connector subassemblies $3_1$ and $3_2$. However, the conversations relating to the changeover function are carried out exclusively over the supervising bus 10. To this end, provision is for example made to transmit over the bus 10 by way of the AAL/ATM modules $2_{N+1}$, $2_{N+2}$ between the two management subassemblies $4_1$ and $4_2$ two signals, a presence signal which indicates the physical presence of a counterpart BRAGS module and a command signal which indicates to a management subassembly ($4_1$, $4_2$) that its counterpart is the "master".

The "command" signal consists for example of a square signal sent by the management subassembly $4_1$; $4_2$, via the ATM module of the subassemblies $2_{N+1}$, $2_{N+2}$. This signal may be conveyed on two independent wires, each corresponding to a given direction of the conversation. In this case a management subassembly $4_1$, $4_2$ which is not the "master" does not send any signal to its counterpart but it continuously observes the square signal sent by the "master", and decides to become the "master" in its turn should this signal deteriorate, this possibly being the symptom of a software blockage of the "master" management module. Furthermore, a nonvolatile memory, not represented, may be provided in each management subassembly $4_1$ and $4_2$ in order to store the configuration of the switch even after a BRAGS module has been powered-down and to adjudicate between the management subassemblies $4_1$ and $4_2$ when the latter simultaneously claim the role of "master", by taking account of the consistency and the completeness of the configuration data.

Likewise, a software procedure which is within the scope of the person skilled in the art may be implemented so as to allow the "master" management subassembly to choose the cross-connection subassembly $3_1$, $3_2$ to be activated. This choice may be made as a function of the results of tests on the running of the cross-connection subassemblies $3_1$ and $3_2$. However, if the results of the tests show that the cross-connection subassemblies $3_1$ and $3_2$ are running correctly, the management subassembly which is in command preferably chooses the cross-connection subassembly situated in the same BRAGS module as itself, the possible changeover from one cross-connection subassembly $3_1$, $3_2$ to the other then being performed only when the conditions are favourable, in the case of light traffic or a slack period for example. It is also necessary for the master management subassembly to be able to inform all of the modules of the switch of the choice of the "active" cross-connector subassembly. This information is transmitted over the supervising bus 10 to all the modules. Thus, the "slave" management subassembly can speak to the "master" via the "active" cross-connector subassembly and initiate a much richer conversation than is allowed by just the supervising bus 10 reserved for redundancy and changeover. Likewise, the JUNCT modules 8 send and receive their ATM cells of the only "active" cross-connector subassembly, this enabling the "master" management subassembly to supervise the JUNCT modules $8_1$ to $8_N$ by virtue of the ATM cells of the private OAM type.

What is claimed is:

1. Distributed-architecture device for switching ATM cells, comprising access means, means for executing the ATM layer function, means for executing the cross-connection of the ATM cells and management means, the whole of the means of the device being distributed between two types of hardware modules, a first type composed of unction modules and a second type composed of two cross-connection and management modules, one operating in an "active" mode and the other in a "passive" mode, characterized in that the access means are installed in each junction, the means of executing the ATM layer function are installed in each junction and in each of the two cross-connection and management modules and in that it comprises a supervising bus which links the first and second types of module, so as to ensure rapid and automatic reconfiguration of the device in the event of a fault in one of its constituents, the supervising bus serving to convey, under the control of the management means, signals indicative of the "master" and "slave" management means as well as a signal indicative of the "active" cross-connection module, and characterized in that each cross-connection and management module comprises a cross-connector subassembly coupled to the junction modules and to subassemblies for managing the modules of the second type so as to allow a changeover of the operation of the device from the cross-connection and management module currently in use to the other cross-connection and management module when a fault occurs in the cross-connection and management module currently in use.

2. Device according to claim 1, characterized in that the management subassemblies of each module of the second type share the roles of a "master" management subassembly and a "slave" management subassembly, the "master" management subassembly catering for all the operational processing and the "slave" management subassembly performing operations for testing and monitoring the "master" management subassembly, for eavesdropping on the data flows and lastly for acquiring, from the "master" management subassembly, data indispensable to the resuming of the task of the "master" management subassembly if the latter should experience a defect.

3. Device according to claim 2, characterized in that the "master" management subassembly applies a command signal to the supervising bus so as to alert the "slave" management subassembly of the fact that it is still "active".

4. Device according to claim 3, characterized in that the "master" management subassembly chooses the cross-connection and management module which is to be active by taking account of results of hardware tests and by favouring the cross-connection module which is located in the same cross-connection and management module as itself.

5. Device according to claim 4, characterized in that the "master" management module informs the first and second types of modules of the identity of the "active" cross-connection module by a signal applied to the supervising bus.

6. Device according to claim 1, characterized in that each cross-connection and management module comprises a dismantleable management assembly consisting of a card with processor interfaced to other subassemblies.

7. Device according to claim 1, characterized in that each cross-connection and management module comprises a dismantleable cross-connection module.

8. Device according to claim 1, characterized in that each junction comprises a dismantleable means of access.

9. Device according to claim 1, characterized in that the supervising of the junction modules outside of operations of redundancy and changeover is performed by private OAM cells which borrow the ATM data links between modules.

10. Device according to claim 1, characterized in that it comprises ATM links for enabling each cross-connector subassembly to communicate with the ATM layer of another cross-connection and management module and ATM links for enabling each cross-connector subassembly to communicate with the ATM layer of the cross-connection and management module to which it belongs.

11. Device according to claim 2, characterized in that each cross-connection and management module comprises a dismantleable management subassembly consisting of a card with processor interfaced to other subassemblies.

12. Device according to claim 3, characterized in that each cross-connection and management module comprises a dismantleable management subassembly consisting of a card with processor interfaced to other subassemblies.

13. Device according to claim 4, characterized in that each cross-connection and management module comprises a dismantleable management subassembly consisting of a card with processor interfaced to other subassemblies.

14. Device according to claim 5, characterized in that each cross-connection and management module comprises a dismantleable management subassembly consisting of a card with processor interfaced to other subassemblies.

15. Device according to claim 2, characterized in that each cross-connection and management module comprises a dismantleable cross-connection module.

16. Device according to claim 3, characterized in that each cross-connection and management module comprises a dismantleable cross-connection module.

17. Device according to claim 4, characterized in that each cross-connection and management module comprises a dismantleable cross-connection module.

18. Device according to claim 5, characterized in that each cross-connection and management module comprises a dismantleable cross-connection module.

19. Device according to claim 6, characterized in that each cross-connection and management module comprises a dismantleable cross-connection module.

20. Device according to claim 2, characterized in that each junction comprises a dismantleable means of access.

21. A distributed-architecture device for switching ATM cells, comprising:

first and second types of hardware modules, said first type of hardware module including junction modules, and said second type of hardware module including at least two cross-connection and management modules, a first of said cross-connection and management modules operating in an active mode, and a second of said cross-connection and management modules operating in a passive mode, and wherein said first and second cross-connection and management modules include a supervising bus for automatic reconfiguration of the device in the event of a fault in one of said at least two cross-connection and management modules, each of said cross-connection and management modules including a means for executing ATM layer functions;

said junction modules including access means;

said supervising bus is configured to convey signals indicative of whether or not each of said first and second cross-connection and management modules are operating as a master or a slave, said supervising bus is further configured to convey signals indicative of whether or not each of said first and second cross-connection and management modules are operating in an active mode or an inactive mode of operation; and each of said cross-connection and management modules further includes a cross-connector subassembly coupled to the junction modules and to subassemblies for managing the modules of said second type so as to allow a changeover of the device operation from a first cross-connection and management module currently in use to a second cross-connection and management module when a fault occurs in the first cross-connection and management module.

* * * * *